(12) United States Patent
Marcin

(10) Patent No.: US 7,867,470 B1
(45) Date of Patent: Jan. 11, 2011

(54) ON-SITE MANUFACTURE OF SULFURIC ACID

(75) Inventor: Mark A. Marcin, Northglenn, CO (US)

(73) Assignee: Global Water Technologies, Inc., Indianapolis, IN (US)

( * ) Notice: Subject to any disclaimer, the term of this patent is extended or adjusted under 35 U.S.C. 154(b) by 0 days.

(21) Appl. No.: 12/535,107

(22) Filed: Aug. 4, 2009

Related U.S. Application Data

(60) Provisional application No. 61/087,520, filed on Aug. 8, 2008.

(51) Int. Cl.
  *C01B 17/69* (2006.01)
  *C01B 17/74* (2006.01)
  *C01B 17/80* (2006.01)

(52) U.S. Cl. ............... 423/522; 422/129; 422/160; 422/161

(58) Field of Classification Search ........... 423/522; 422/129, 160, 161
See application file for complete search history.

(56) References Cited

U.S. PATENT DOCUMENTS

| | | | |
|---|---|---|---|
| 6,080,368 A | 6/2000 | Jackson | |
| 6,248,299 B1 | 6/2001 | Jackson | |
| 6,500,391 B1 | 12/2002 | Jackson | |
| 6,506,347 B1 | 1/2003 | Jackson | |
| 6,689,326 B1 | 2/2004 | Jackson | |
| 2008/0044342 A1* | 2/2008 | Muller et al. | 423/522 |

OTHER PUBLICATIONS

The Sweetwater Solution SS - 10, Sweetwater International, Inc. 2007, 2 pages.

* cited by examiner

*Primary Examiner*—Timothy C Vanoy
(74) *Attorney, Agent, or Firm*—Woodard Emhardt Moriarty McNett & Henry

(57) ABSTRACT

A method and system for on-site production of solutions is described according to embodiments. In an embodiment, the solution is sulfuric acid.

16 Claims, 2 Drawing Sheets

ON-SITE MANUFACTURE OF SULFURIC ACID

CROSS REFERENCE TO RELATED APPLICATION

This application claims priority to provisional patent application Ser. No. 61/087,520, filed Aug. 8, 2008, entitled "ON-SITE MANUFACTURE OF SULFURIC ACID," which is herein incorporated in its entirety for all purposes.

BACKGROUND

Aspects of the disclosure are related, in general, to the field of manufacturing sulfuric acid and, more specifically, to the field of on-site manufacture of relatively small amounts of sulfuric acid for on-site use of mining, fertilizer production, ethanol production, wastewater treatment and other uses.

Sulfuric acid may be produced in very large quantities (several thousand tons per day) at a manufacturing facility. Raw sulfur may be burned with air to form sulfur dioxide. The sulfur dioxide gas may then be passed through a catalyst at high temperature (sometimes vanadium oxides at 500-700 C) to convert (oxidize) the sulfur dioxide to sulfur trioxide gas. The sulfur trioxide gas may then be scrubbed (mixed) with concentrated (93-98%) sulfuric acid. Under these conditions, the sulfur trioxide may then react with water to form sulfuric acid. Make-up water may be added to maintain the concentration and continuously produce sulfuric acid. At a manufacturing facility, this may be accomplished by burning 1000's of tons of sulfur per day. The acid may then be shipped via semitrailer, train or other means to the customer. The shipping of sulfuric acid may be very costly, and dangerous.

SUMMARY

Methods and systems capable of on-site manufacture of relatively small amounts (approximately 3000 pounds) of sulfuric acid per day, are disclosed. In an embodiment, a method and system may include liquefying raw sulfur. The liquid sulfur may then be gasified. This may be accomplished by burning high purity (99.5%+) molten sulfur in air in a burn chamber.

This may form sulfur dioxide gas. This gas may be recirculated (mixed) with a solution via an eductor type apparatus (air scrubbing device, venturi), which may absorb the gas into the liquid phase forming sulfurous acid. This may be accomplished using a 20-25% sulfuric acid solution as it may have a satisfactory solution conductivity to allow electrical current to flow therethrough.

This solution may then be delivered to an oxidizer. The oxidizer may be capable of oxidizing the sulfurous acid to sulfuric acid. The concentration of the sulfuric acid may then be above 20-25%. A portion of the total amount of sulfuric acid may then be diverted to a storage tank for use.

Make-up water may be added to maintain concentration, and to produce excess sulfuric acid. The solution may then be filtered and cooled prior to being sent back to the educator/venturi to remove impurities which accumulate due to the use of unfiltered air in the burning process because the air or oxygen used may contain impurities.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiments disclosed herein. On the contrary, the intent is to cover all alternatives, modifications, and equivalents.

DETAILED DESCRIPTION

Figure 1:
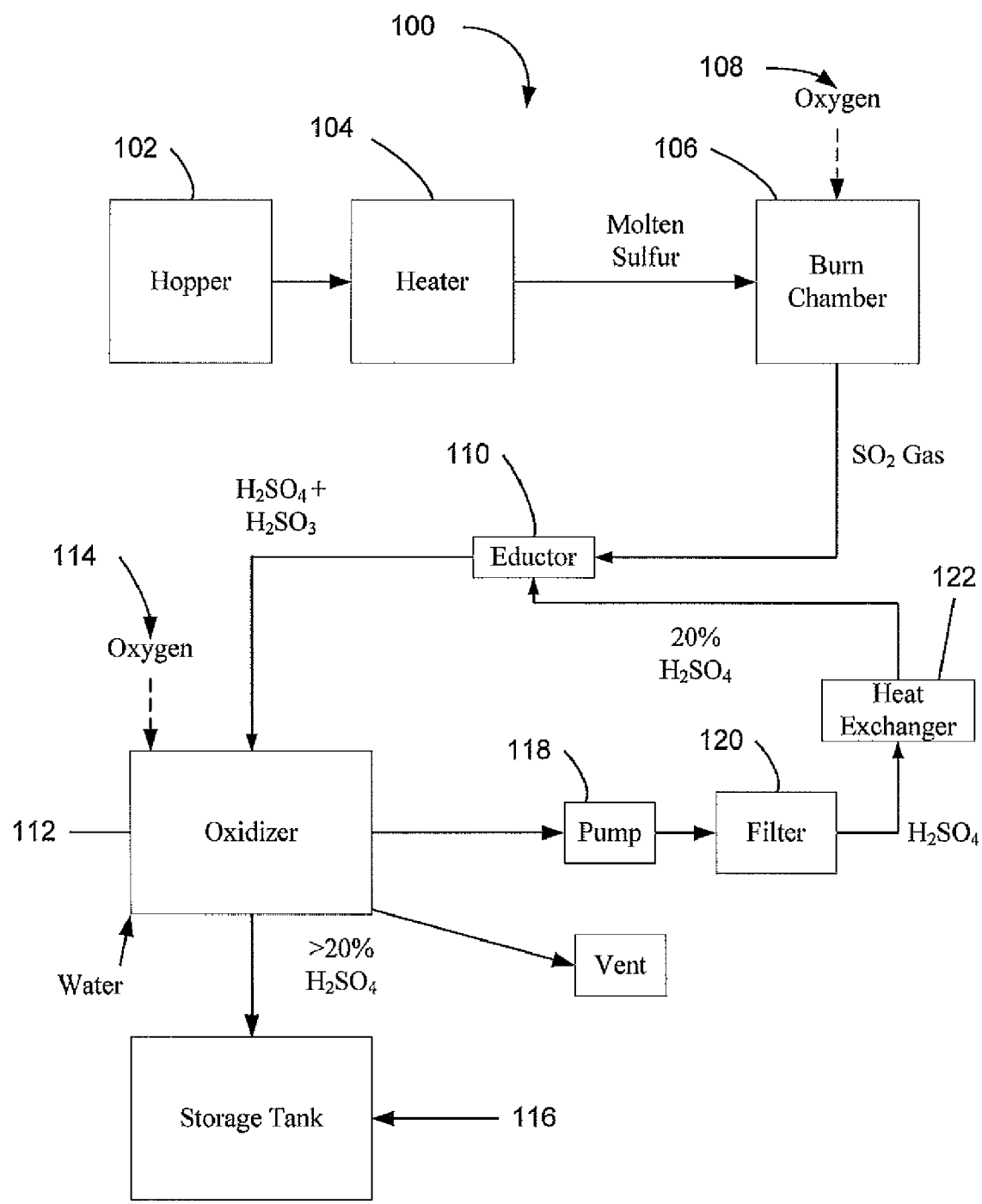
FIG. 1 is a block diagram of a system according to an embodiment for producing sulfuric acid.
Figure 2:
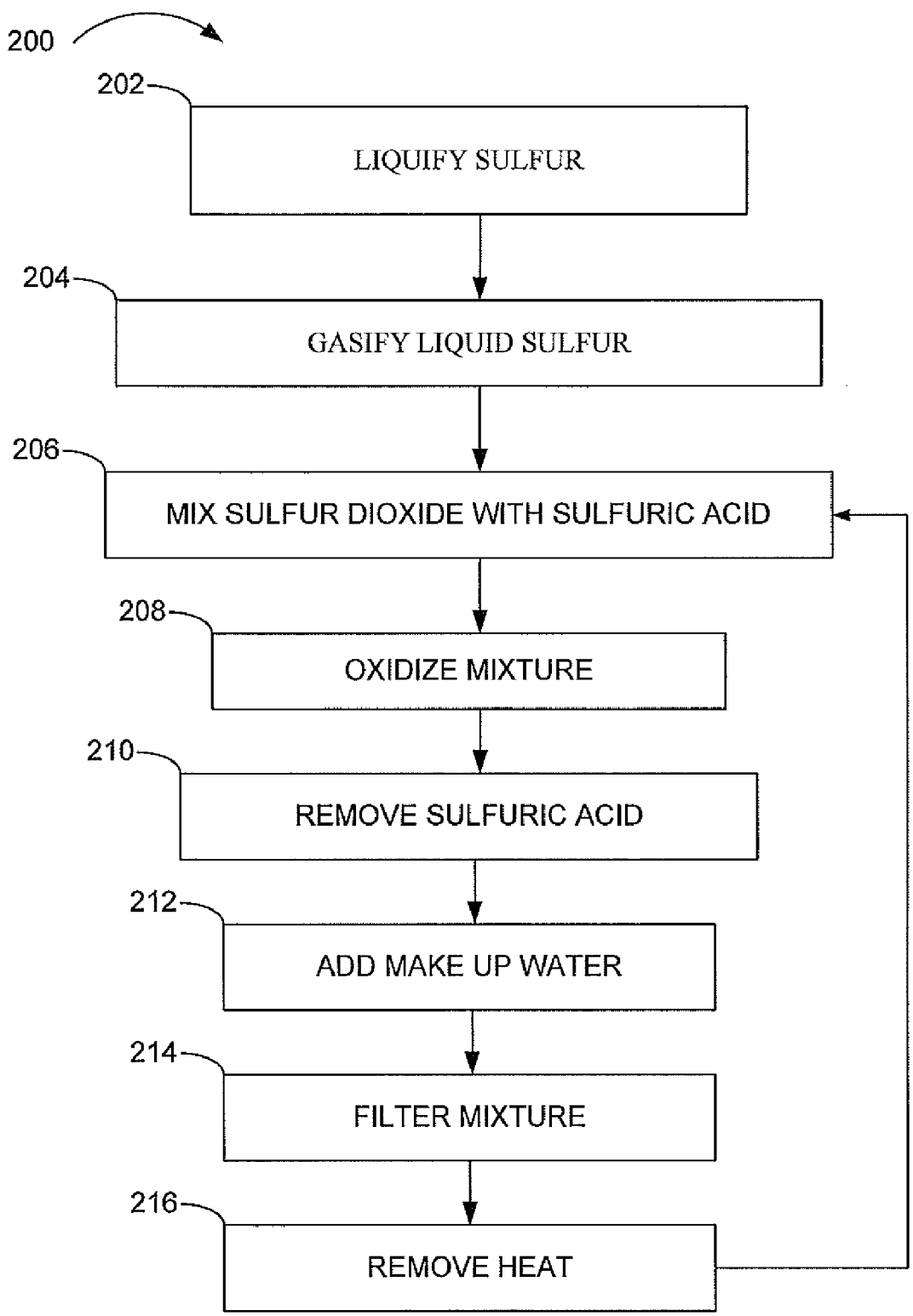
FIG. 2 is a flow diagram of a method according to an embodiment for producing sulfuric acid.

FIGS. 1-2 and the following description depict embodiments to teach those skilled in the art how to make and use the embodiments. For the purpose of teaching principles, some conventional aspects have been simplified or omitted. Those skilled in the art will appreciate variations from these embodiments that fall within the scope of the disclosure. Those skilled in the art will also appreciate that the features described below can be combined in various ways to form multiple embodiments. As a result, the disclosure is not limited to the specific embodiments described below, but only by the claims and their equivalents.

FIG. 1 is a block diagram of a system 100 for producing sulfuric acid, according to embodiments. The system 100 optionally includes a storage device 102, such as a hopper capable of storing raw sulfur. It will be appreciated that any device capable of storing raw sulfur may be used.

System 100 may also include a heater 104, capable of receiving raw sulfur and liquefying the raw sulfur to create molten sulfur. Heater 104 may be maintained at around 240-260 degrees Fahrenheit to accomplish this. Any suitable heater and vessel system may be utilized to accomplish the liquefying of sulfur.

In an embodiment, system 100 may also include a burn chamber 106. Burn chamber 106 may be capable of receiving molten sulfur, and converting it to sulfur dioxide gas ($SO_2$). This may be accomplished by spraying in the molten sulfur, adding air or oxygen, at a temperature greater then 310F. The burning process is self-sustaining once initiated and requires no additional energy. Using dry pure oxygen 108 may reduce the amount of impurities, which may limit the amount of filtering which may need to be done. Any suitable device may be used as the burn chamber.

In an embodiment, system 100 may also include an eductor 110 or similar device. Eductor 110 may be capable of drawing in the sulfur dioxide gas via the venturi effect as a 20% $H_2SO_4$ solution flows therethrough, thereby mixing the solution and the gas. This may create a mixture of sulfurous acid ($H_2SO_3$) and sulfuric acid ($H_2SO_4$). It will be appreciated that the sulfur dioxide gas and sulfuric acid may be mixed in other manners, and this disclosure is intended to encompass alternatives for accomplishing this process.

In an embodiment, system 100 may also include an oxidizer 112 or similar device. Oxidizer 112 may be capable of receiving the mixture of sulfurous acid ($H_2SO_3$) and sulfuric acid ($H_2SO_4$), and oxidizing the solution to create a solution of sulfuric acid. Oxidizer 112 may accomplish this in part by optionally adding air, hydrogen peroxide or oxygen 114. In an embodiment, this process may be accomplished by introducing the solution into an electrode chamber (oxidizer) whereby the sulfurous acid and associated sulfites are oxidized at the electrode surface to sulfuric acid, thus increasing the concentration of sulfuric acid in the recirculation system. It will be appreciated that the solution may be oxidized in many other ways, all of which are intended to be encompassed by this disclosure.

In an embodiment, the oxidative electrolysis may be controlled using a power controller to apply a DC voltage to electrodes in the chamber, and may be modified to output power with a specific waveform. The electrodes can be of any material compatible with 20-30% sulfuric acid including carbon and high nickel alloys, ceramics, and/or other materials, and/or combinations thereof.

In embodiments, the conductivity or specific gravity of the solution may be monitored inline continuously and the sulfuric acid concentration controlled by removing small quantities of acid to a storage tank 115 and adding make-up water 116 to the process. The 20-25% sulfuric acid that accumulates in the storage tank 115 can be utilized for a variety of processes from wastewater treatment to metal finishing and fertilizer manufacturing. The control of the acid purity may be based at least in part upon the purity of sulfur burned and the characteristics of the make-up water.

Excess gasses may be produced which may be vented via vent 117. Vent 117 may include a precipitator or other device to reduce gas emissions. Gases commonly generated will be those that originate in the air used during combustion and will include the oxides of carbon and nitrogen. Furthermore, other electrolysis products such as hydrogen gas may be generated.

According to embodiments, system 100 may also include a pump 118 capable of recirculating the acidic mixture in a generally closed loop. Pump 118 may pump the solution through a filter 120. Filter 120 may be capable of filtering out impurities created along the process, and impurities in the system.

During the process of absorbing sulfur dioxide and the electrolytic oxidation of sulfurous acid and sulfites, heat is generated and must be removed using a heat exchanger 122. In an embodiment, heat exchanger may include a plate and frame heat exchanger, and/or any other method and system for exchanging heat. The waste heat may be captured and reused to heat the sulfur melting pot or used in other processes. The sulfuric acid solution is filtered via filter 120 prior to passing through the heat exchanger 122 as the scrubbing of gaseous sulfur dioxide may contain particulate matter.

FIG. 2 provides a flow diagram of a method 200 for producing sulfuric acid, according to embodiments. In the method 200, raw sulfur is liquefied to create molten sulfur (operation 202). In one embodiment, this may be accomplished in a vessel with am immersion heater.

Method 200 may also include gasifying/burning the molten sulfur (operation 204). This may be accomplished at least in part in a burn chamber while adding air. The molten sulfur may enter the burn chamber via a spray nozzle or other device, which may increase the affected surface area to allow the burn chamber to operate more efficiently. Sulfur dioxide gas may be produced by this operation.

According to embodiments, method 200 may include mixing the sulfur dioxide gas with a 20-25% sulfuric acid solution (operation 206). This may be accomplished at least in part using a venturi effect eductor to mix the gas and the liquid.

Method 200 may include oxidizing the mixture (operation 208). This may be accomplished at least in part using an electrode chamber. The conductivity or specific gravity of the resultant sulfuric acid solution may be monitored and used to remove sulfuric acid 210 from the process to a storage tank for use. Furthermore, the conductivity or specific gravity may be used to add quantities of make up water 212 to maintain the concentration of 20-25% sulfuric acid solution in the recirculation system.

According to embodiments, method 200 may include filtering the solution 214 to remove impurities such as particulate created by the process, or from within the solution. Furthermore, as certain reactions occurring in the process are exothermic, heat may be removed 216, at least in part via a heat exchanger.

The resultant sulfuric acid solution is then recirculated and the method recurs as needed. Although this method is shown in a particular order, it will be appreciated that the method may be carried out in other order, which is encompassed by this disclosure.

While FIG. 2, as well as other flow diagrams presented herein, may indicate a particular order of execution, other orders of execution, including concurrent or simultaneous execution, may be possible while remaining within the scope of the invention.

It will be appreciated that even though this method and/or system is described as producing sulfuric acid, many other solutions and/or gasses may be produced utilizing the mixing and oxidation with an acid of the system and/or method, including other acids.

In this detailed description, numerous specific details are set forth to provide a thorough understanding of claimed subject matter. However, it will be understood by those skilled in the art that claimed subject matter may be practiced without these specific details. In other instances, well-known methods, procedures, components and/or devices have not been described in detail.

Embodiments discussed and/or claimed may include one or more apparatuses for performing the operations herein. Such an apparatus may be specially constructed for the desired purposes, or it may comprise a general-purpose device selectively activated and/or reconfigured by a program stored in a control device.

In the description and/or claims, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of producing sulfuric acid, comprising:
liquefying a sulfur compound to create molten sulfur;
gasifying the molten sulfur to produce sulfur dioxide;
mixing the sulfur dioxide with sulfuric acid at a first concentration to create a solution of sulfurous acid and sulfuric acid;
oxidizing the mixture to create sulfuric acid at a generally higher concentration than the first concentration;
removing some of the higher concentration sulfuric acid; and
adding water or another solution to create sulfuric acid generally near the first concentration.

2. The method according to claim 1, further comprising filtering the solution.

3. The method according to claim 1, further comprising removing heat from the solution.

4. The method according to claim 1, further comprising adding air.

5. The method according to claim 1, further comprising adding oxygen.

6. A system capable of producing sulfuric acid, comprising:
- a heater capable of liquefying raw sulfur, thereby forming molten sulfur;
- a burn chamber capable of receiving molten sulfur and air and capable of creating sulfur dioxide gas;
- a mixer capable of receiving the sulfur dioxide gas and sulfuric acid at a first concentration, and capable of mixing the sulfur dioxide gas with the sulfuric acid at a first concentration thereby creating a mixture of sulfurous and sulfuric acid; and
- an oxidizer capable of receiving the mixture of sulfurous and sulfuric acid, and oxidizing the mixture of sulfurous and sulfuric acid to create sulfuric acid at a second concentration generally higher than the first concentration.

7. The system according to claim 6, further comprising a storage tank capable of holding sulfuric acid produced.

8. The system according to claim 6, further comprising a filter capable of reducing impurities in the system.

9. The system according to claim 6, further comprising a heat exchanger capable of removing heat from the system.

10. The system according to claim 6, further comprising a raw material storage system capable of storing raw sulfur, and delivering it to the system.

11. The system according to claim 6, further comprising a vent capable of venting off excess gasses from the system.

12. The system according to claim 6, further comprising an air delivery system capable of delivering air to the system.

13. The system according to claim 6, further comprising an oxygen delivery system capable of delivering oxygen to the system.

14. The system according to claim 6, further comprising pump capable of moving materials, mixtures, and/or solutions within the system.

15. The system according to claim 6, further comprising a water delivery system capable of delivering water and/or make up water to the system.

16. A method of producing sulfuric acid, comprising:
- mixing sulfur dioxide gas with a sulfuric acid solution, the solution being at a first concentration to create a solution of sulfurous acid and sulfuric acid; and
- oxidizing the mixture to create sulfuric acid at a generally higher concentration that the first concentration.

* * * * *